Figure 15:
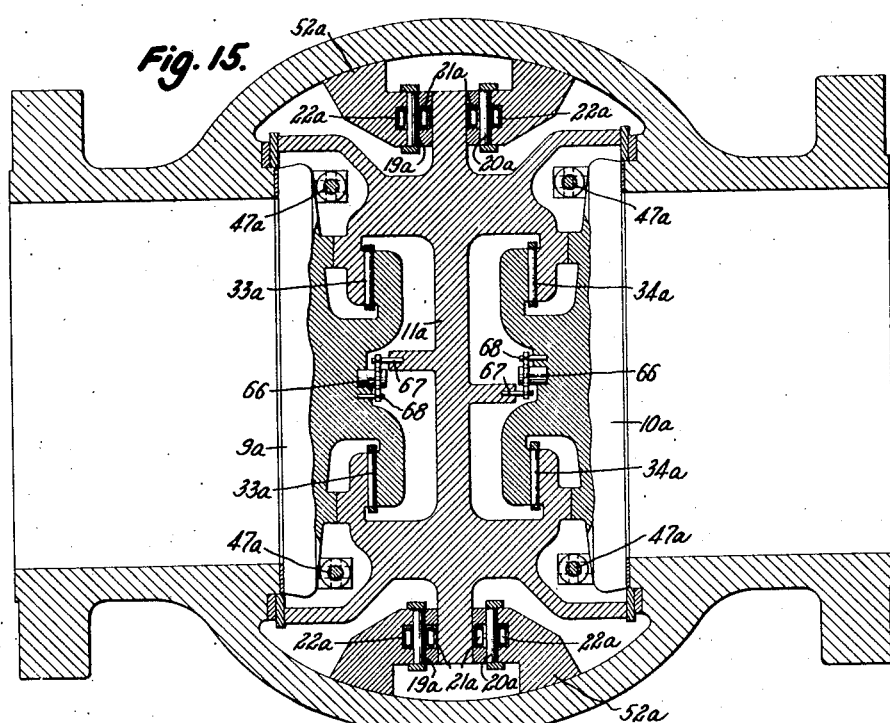

May 28, 1957
H. G. DOSTER
2,793,831
GATE VALVES
Filed Feb. 15, 1954
8 Sheets-Sheet 1
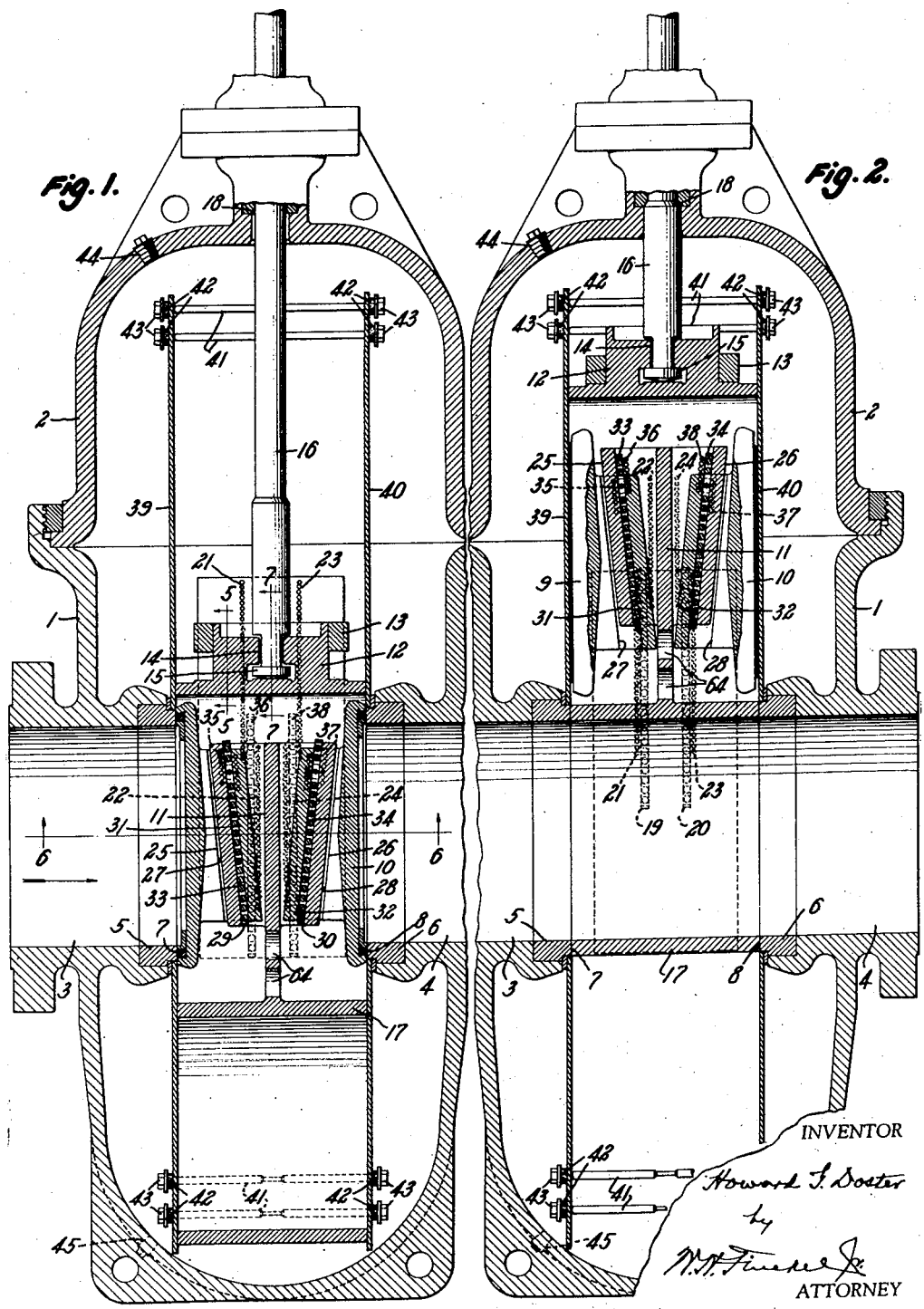
INVENTOR
Howard T. Doster
by
ATTORNEY

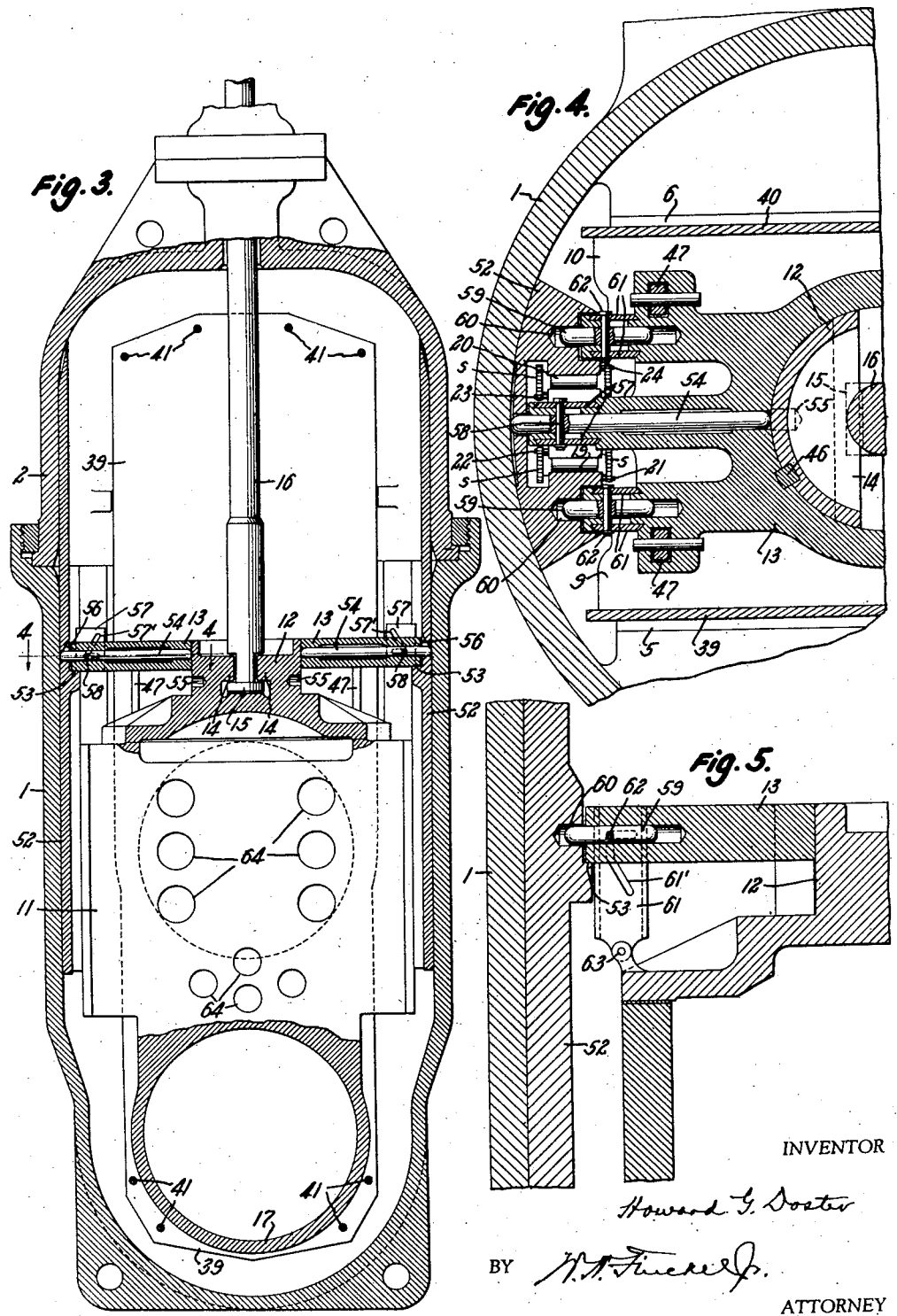

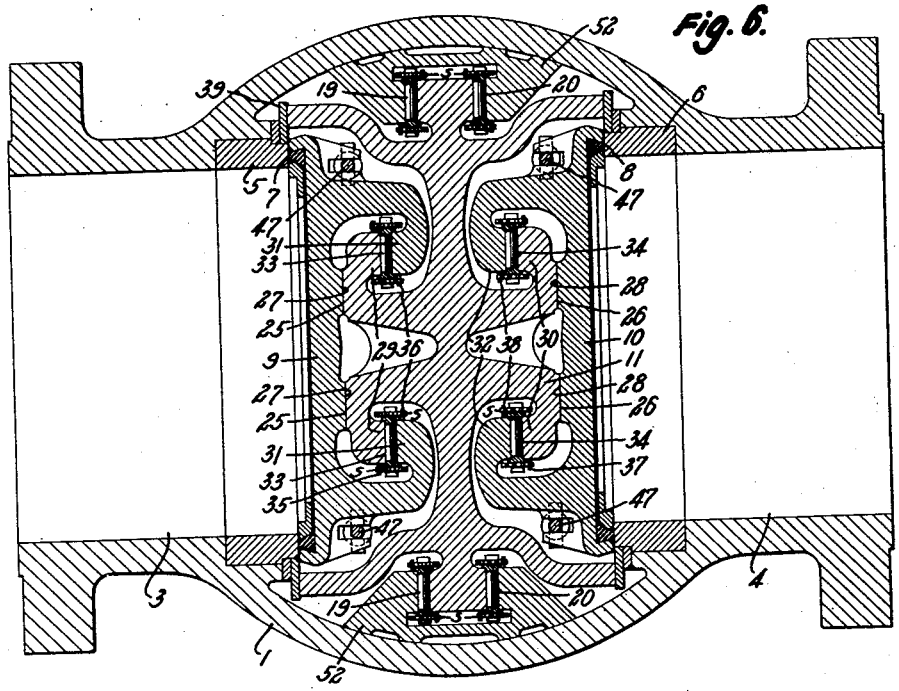

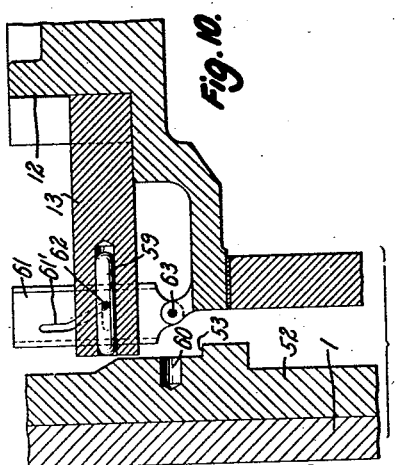
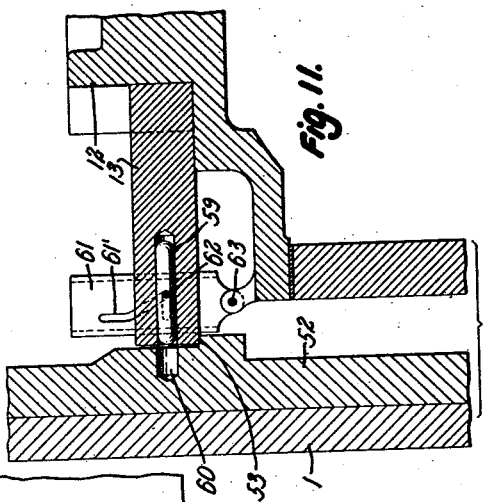
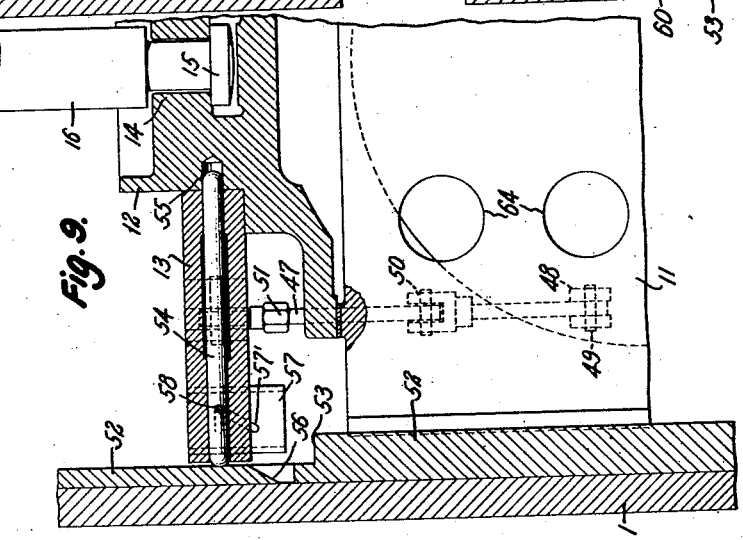
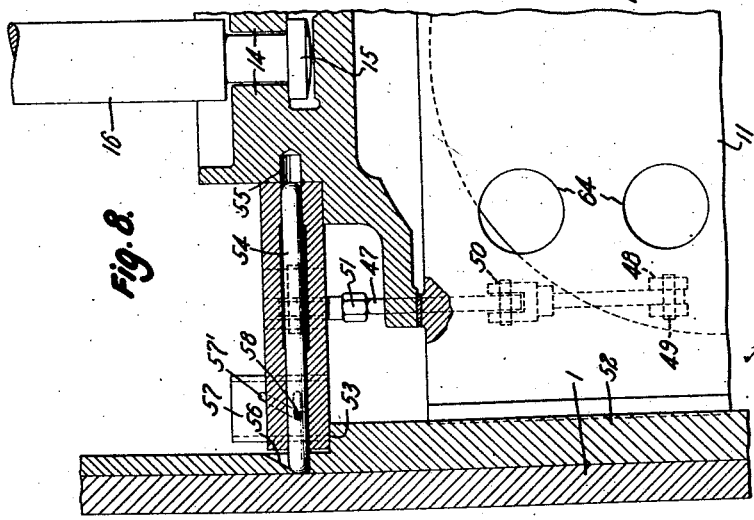

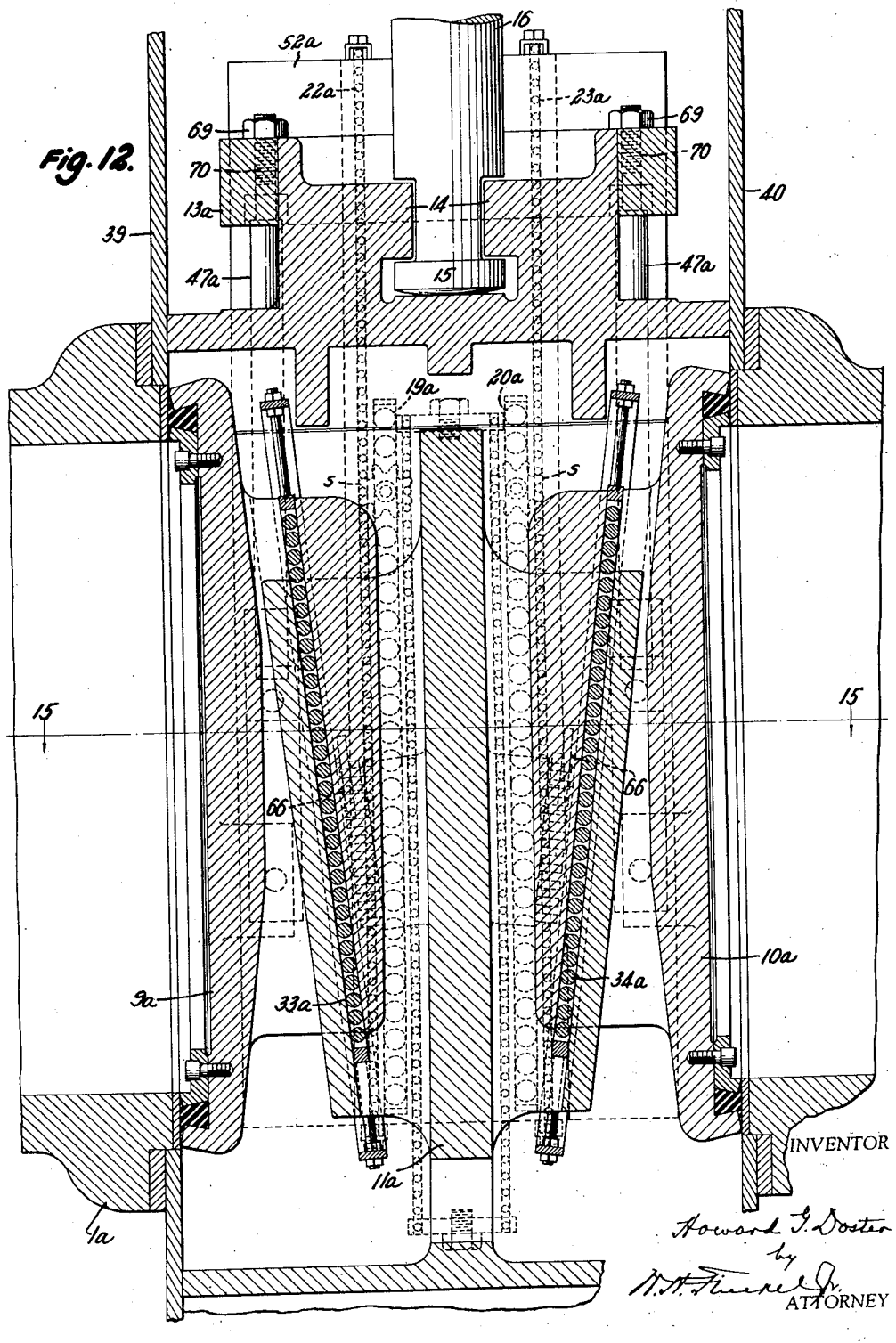

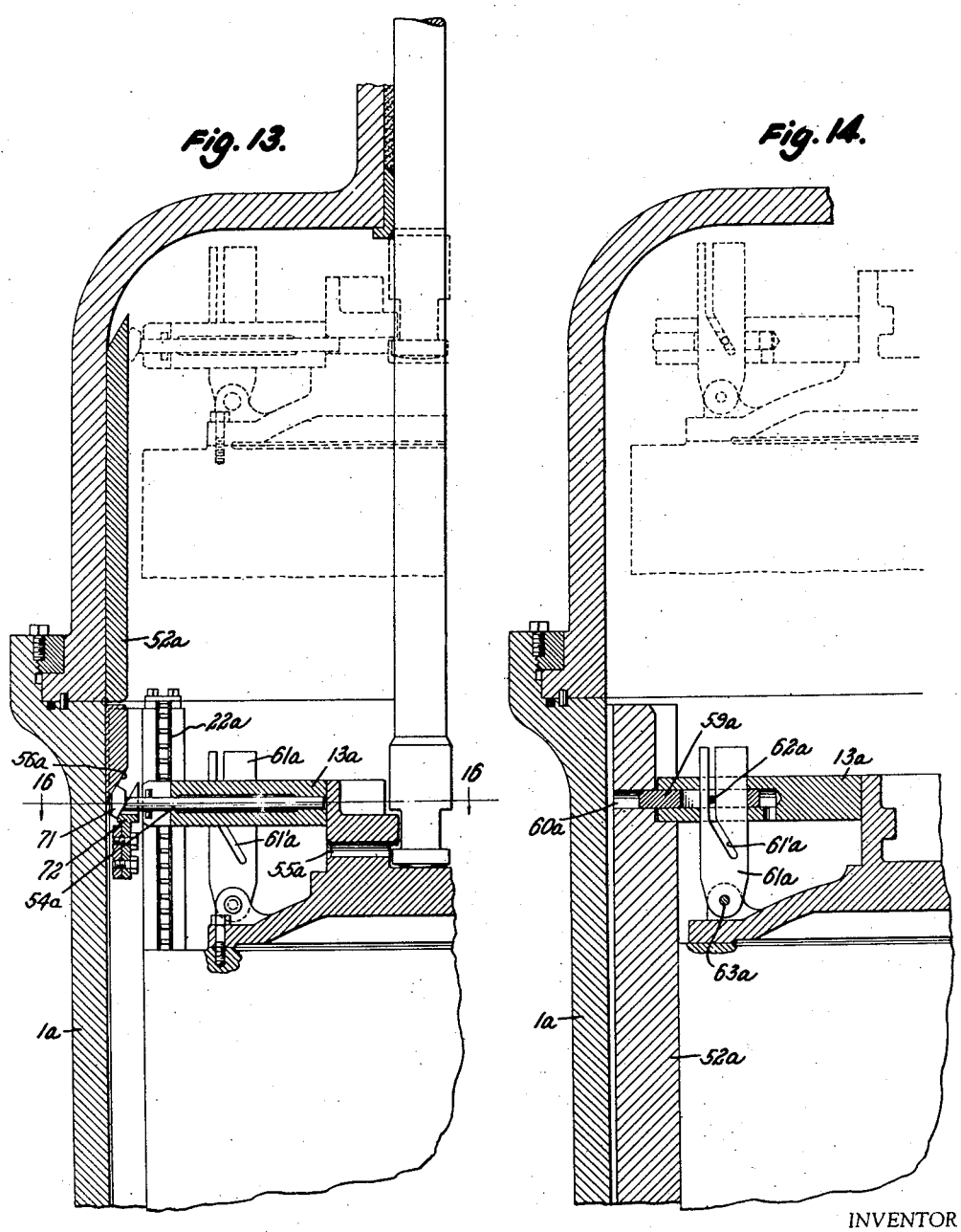

May 28, 1957

H. G. DOSTER 2,793,831

GATE VALVES

Filed Feb. 15, 1954

8 Sheets-Sheet 7

INVENTOR
Howard T. Doster
by
ATTORNEY

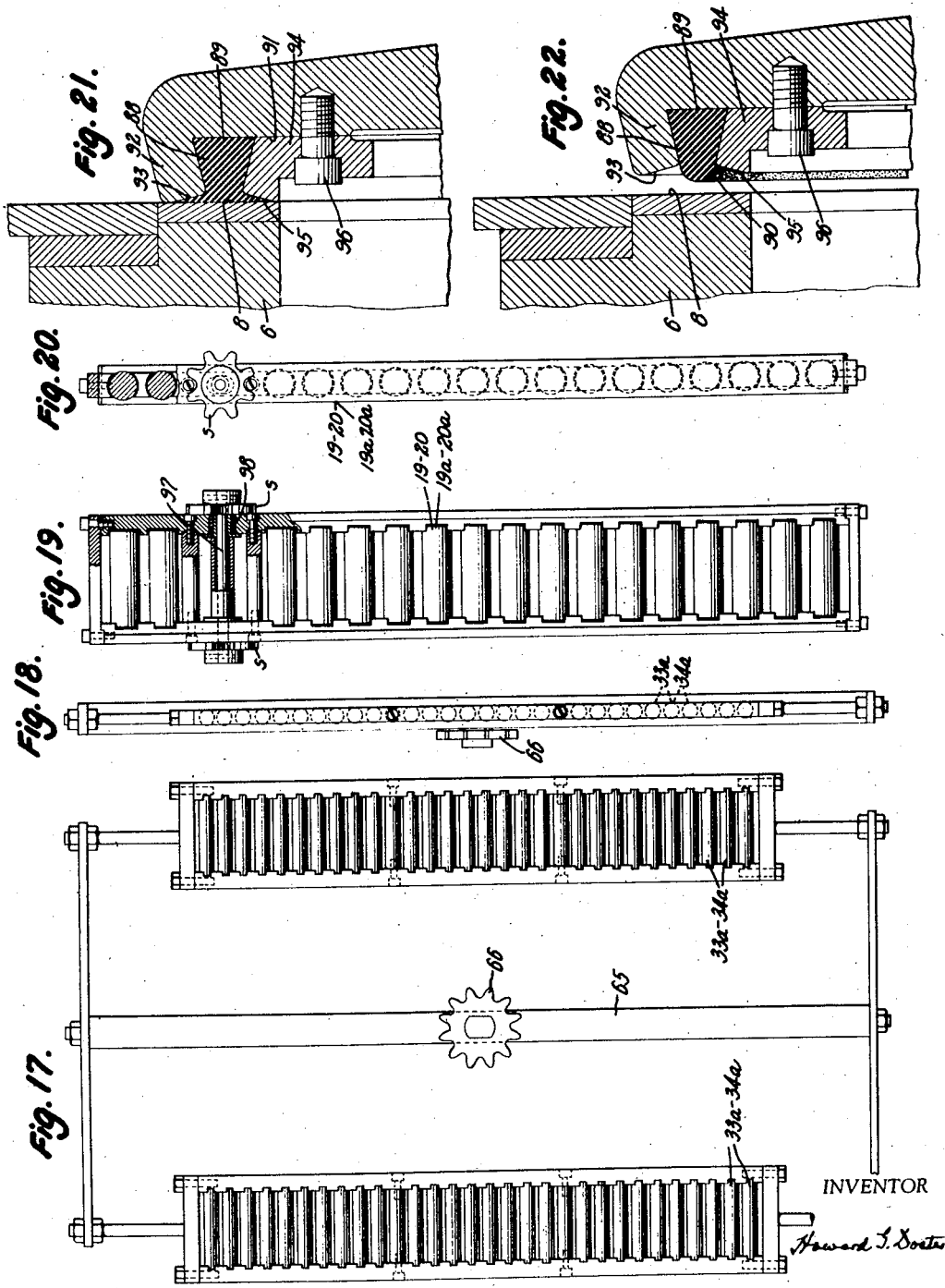

United States Patent Office 2,793,831
Patented May 28, 1957

2,793,831

GATE VALVES

Howard G. Doster, Wadsworth, Ohio, assignor to The Ohio Injector Company, Wadsworth, Ohio, a corporation of Ohio Application February 15, 1954, Serial No. 410,198

8 Claims. (Cl. 251—197)

This invention relates to valves, and it has special reference to gate valves of substantially the type disclosed in the co-pending application of Charles Wheatley for patent for Gate Valve, filed April 23, 1951, Serial No. 222,359, now Patent No. 2,676,780, dated April 27, 1954, but embodies modifications and improvements thereover of a structural and operative nature.

One object of the invention is to provide a valve for pipe line service in which a yieldable or pliable member is employed for insuring proper sealing seating between the valve disc and the seating surface of its complemental valve port, and to embody in the movable parts of the valve, and in the valve body, combinations of elements whereby predetermined shifting of the valve disc with respect to its seating surface at the valve port may be attained, and proper and effective seating of the yieldable or pliable seating member accomplished, and its unseating effected, without injury to such sealing member.

Another object of the invention, particularly in its application to double-disc gate valves, is to provide for unseating of the disc at the inlet, or "up-stream" port of the valve prior to unseating of the disc at the outlet or "down-stream" port, so that the disc at such "down-stream" port will be held to its seat by pressure admitted to the valve body until, upon further operating of the gate mechanism, the disc of the "down-stream" port will be drawn inwardly from its seating surface in the direction of the axis of said port prior to its being moved with the gate mechanism transversely to such axis.

A further object is to provide antifriction means between the gate element and the valve discs carried by it in order that opening and closing of the valve may be accomplished with the greatest ease despite high pressure of the fluid in the line controlled by the valve.

Still another object of the invention is to provide between the disc-carrying gate element and the discs a connection which will insure their proper relative functioning and preclude their separation in service.

A still further object is to provide in the antifriction bearing means between the disc-carrying gate element and its disc or discs, means providing for relative travel of these parts while maintaining the antifriction means always in cooperative relation to said gate element and disc or discs.

Another object is to provide for the introduction into, and retention within, the valve body, and in contact with the operative parts of the gate mechanism, of a body of lubricant and, to this end, for sealing such lubricant against escape through the valve ports.

Other objects and advantages will be apparent from the following description.

Figure 16:
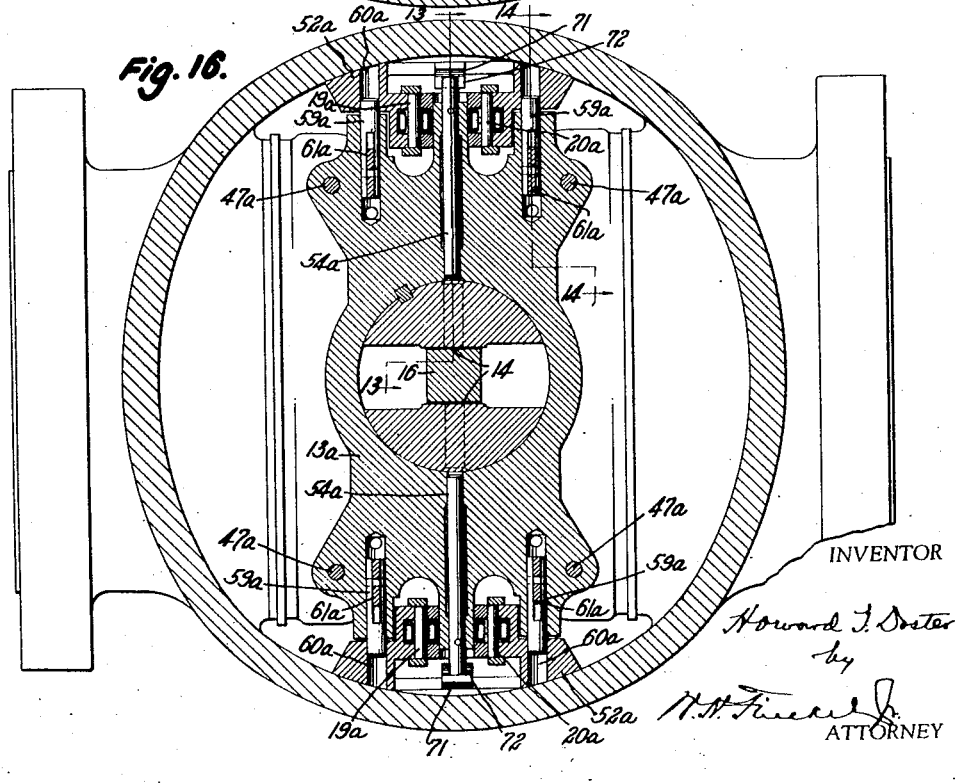

In the accompanying drawings which show a number of embodiments of the invention, and in the several figures of which like parts are similarly designated, Fig. 1 is a vertical axial sectional elevation, with parts broken away, of a valve embodying the features of the invention, the gate, wedge, and disc members being shown in the closed-valve position, Fig. 2 is a view similar to Fig. 1, but with the gate, wedge and disc members shown in the open-valve position, and with the conduit member in alignment with the inlet and outlet ports of the valve, Fig. 3 is a section taken through the valve upon its central vertical axis at 90° to the section shown in Fig. 1, Fig. 4 is an enlarged fragmentary sectional elevation taken on the line 4—4 of Fig. 3, Fig. 5 is an enlarged sectional elevation taken on the line 5—5 of Fig. 1, Fig. 6 is an enlarged transverse sectional elevation taken on the line 6—6 of Fig. 1, Fig. 7 is an enlarged, fragmentary sectional elevation taken on the line 7—7 of Fig. 1, Figs. 8 and 9 are views similar to Fig. 7, but showing the parts in relatively different positions assumed by them during valve opening and closing movements, Figs. 10 and 11 are views similar to Fig. 5, but showing the parts in positions corresponding to those illustrated in Figs. 8 and 9, Fig. 12 is a greatly enlarged fragmentary sectional elevation of a nature similar to that of Fig. 1 but illustrating a modified embodiment of elements for the valve, Fig. 13 is a fragmentary sectional elevation similar to that of Fig. 7, but showing an embodiment of parts in accordance with the modification illustrated in Fig. 12, and taken on the line 13—13 of Fig. 16, Fig. 14 is a view similar to Fig. 5, but illustrating an embodiment of parts in accordance with the modification of Fig. 12, and taken on the line 14—14 of Fig. 16, Fig. 15 is a sectional elevation, upon a reduced scale, taken on the line 15—15 of Fig. 12, Fig. 16 is a sectional elevation taken on the line 16—16 of Fig. 13, Fig. 17 is a front elevation of an assembly of antifriction bearing means embodied in the modifications illustrated in Figs. 12 to 16, Fig. 18 is an edge elevation of the assembly illustrated in Fig. 17, Fig. 19 is a front view, with parts broken away and in section, illustrating the type of antifriction bearing means embodied in all forms of the invention at various locations with respect to the moving parts thereof, Fig. 20 is a sectional edge view of the assembly illustrated in Fig. 19, and Figs. 21 and 22 are greatly enlarged fragmentary sectional elevations illustrating a valve disc and its sealing ring, and the functioning thereof with respect to the seating surface of the valve port when the disc is in seated and unseated condition.

Referring to Figs. 1 to 11, it will be seen that the valve has a body 1 and a bonnet 2, the body 1 being provided with fluid flow ports 3 and 4, either one of which may be the inlet port or the outlet port of the valve depending upon its arrangement with respect to the direction of flow of fluid in a pipeline in which it may be installed. Each of the ports 3 and 4 has a seat member 5 and 6, respectively, providing a seating surface 7 and 8, respectively, for its cooperating disc means 9 and 10, respectively.

The disc means 9 and 10 are carried by, movable with, and movable relatively to, a wedge member 11 formed at its upper end with a cylindrical boss 12 providing a sliding bearing for a reciprocating collar 13, and providing also a yoke connection 14 for the head 15 of a valve stem 16 adapted to be reciprocated, to impart valve opening and closing movement to the wedge member and its associated parts, by any suitable means such as an air cylinder, a nut and thread connection, or the like, not shown.

Depending from the wedge member 11 is a conduit member 17 having its transverse axis so vertically spaced from the normal closed-valve position of the transverse axis of the disc means 9—10, and hence to the fully opened valve position of the disc means as determined by the limit stop 18 for upward movement of the stem 16, as to insure axial alignment of the conduit member 19 with the ports 3 and 4, as shown in Fig. 2.

Vertical reciprocation of the wedge member 11 is guided and facilitated by antifriction bearing means 19 and 20, see particularly Figs. 2, 4, 6, 19 and 20, provided with sprocket means cooperating with vertical rows of ladder pins 21—22, 23—24, as will be described hereinafter in more detail.

The wedge member 11 is provided, also, with wedging bearing surfaces 25 and 26 for sliding contact with complemental wedging bearing surfaces 27 and 28 provided on the faces of the disc means 9 and 10, and it also has bearing surfaces 29 and 30, disposed oppositely to its bearing surfaces 25 and 26 so as to provide, with complemental bearing elements 31 and 32 forming parts of the disc means 9 and 10, respectively, raceways for antifriction bearing means 33 and 34 of a form substantially similar to that illustrated in Figs. 19 and 20 cooperating with rows of ladder pins 35—36, 37—38 carried by the wedge member and disc means, respectively, as will later be described.

It will be noted that the raceways formed by the bearing surfaces 29—31 and 30—32 converge downwardly as do also the wedging bearing surfaces 25—27 and 26—28, thus providing for relative movement of the disc means 9 and 10 axially with respect to the axes of the ports 3 and 4, as is desired in the functioning of the gate means in both its valve-opening and valve-closing movements as the valve stem 16 is reciprocated.

The features of the valve thus far described are substantially similar, particularly in function, to what is disclosed, in part, in applicant's copending applications for Gate Valves, filed February 3, 1954, Serial No. 407,879, now abandoned, and filed February 15, 1954, Serial No. 410,109, now Patent No. 2,711,877, dated June 28, 1955.

Sealing plates 39 and 40, apertured to embrace the seat members 5 and 6, extend vertically of the valve body and bonnet to an extent adequate to embrace the gate means and conduit member throughout their reciprocative valve opening and closing travel as will be evident from an inspection of Figs. 1 and 2, and these plates are normally biased toward, and into contact with, adjacent faces of the gate means and conduit by tension rods 41 adjacent to their upper and lower ends, these tension rods, as shown in Figs. 1 and 2, being provided with resilient washers 42 bearing against the outer surfaces of the plates and against washers carried on screw-threaded ends of the rods and adjustable thereon by means of nuts 43.

Lubricant, such as a light grease, may be introduced into the interior of the body 1, including the bonnet 2, through a filler opening normally closed by a plug 44 so as to substantially fill such interior, and any moisture which may collect in the lower portion of the body may be drained off through an opening provided with a closure plug 45. It will be apparent that, as the gate means and conduit member reciprocate, the surrounding lubricant will be displaced from the upper to the lower portion of the body, and vice versa.

Having reference particularly to Figs. 3 to 11, it will be seen that the collar member 13 is secured to the cylindrical boss 12 of the wedge member 11 by a key 46 (Fig. 4) to prevent relative rotation between these parts while permitting their relative axial sliding movement, and this collar member 13 is provided with suspension members for the disc means 9 and 10 including rods 47 (Figs. 3, 4, 8 and 9) pivoted to the disc means by ears and pins 48 and 49, respectively, and provided with clevises 50 to permit appropriate oscillation of the disc means upon the rods during their seating and unseating movements.

The rods 47 are also provided with turnbuckles 51 (Figs. 8 and 9) by means of which proper adjustment of the disc means for the appropriate alignment of their axes with the axes of the ports 3 and 4 may be obtained.

In order to provide for relative movement between the wedge member and the disc means, so that proper functioning of the wedges and the antifriction bearing means supplementing such wedges may take place, the collar 13 is mounted for relative axial movement upon the cylindrical boss 12 of the wedge member within predetermined limits, and for the purpose of stopping descent of the collar member 13 during valve closing movement of the disc means 9 and 10 the body is provided with guide means 52 including stop shoulders 53 (Figs. 3, 5 and 7 to 11) against which the collar will abut to limit its downward movement. Thus, with this means for limiting downward movement of the collar 13, and the adjustment of the disc means afforded by the turnbuckles 51, it will be apparent that the desired axial alignment of the discs and seat means may be obtained, while still providing for wedging action between the wedge member and disc means in moving the disc means to their seats.

Upon unseating of the disc means by relative movement of their wedging surfaces, as the wedge member 11 is moved upward, relative movement between the collar 13 and cylindrical boss 12 will take place, and in order that, upon completion of such relative movement, the relative adjustment of the collar and wedge member may be maintained, the collar is provided with diametrically oppositely disposed, axially shiftable, locking pins 54 adapted to have their inner ends engaged in sockets 55 in the cylindrical boss. Axial shifting of the pins 54 is accomplished by cam faces 56 on the guides 52 and by cam plates 57 having cam slots 57' engaging lateral studs 58 carried by the pins 54, these cam plates being upwardly shifted by engagement of their lower edges with the stop shoulders 53.

In order that, when the valve is in closed position, the collar 13 may be fixed against movement upwardly away from the stop shoulders 53 of the guides 52, the collar is provided with locking pins 59 for engagement with sockets 60 in the guides 52 (see Figs. 4 and 5), and these locking pins 59 will be automatically retracted from the sockets 60 (see Fig. 11), upon upward movement of the wedge member with respect to the collar, by means of cam plates 61 having cam slots 61' for engagement with studs 62 passing transversely through the pins 59, these cam plates being affixed to the wedge member by trunnions 63 and being reciprocable, therefore, with such wedge member.

In operation, the functioning of the various parts of the embodiment of the invention thus far described will be substantially as follows:

With the assembly of wedge and disc means and conduit member in the upper position, (Fig. 2), downward movement of the stem 16 will, through the T-head connection 14—15, cause the assembly to travel downward between the guides 52 (Figs. 3 to 11). This downward travel, as has been stated, will force the grease below the conduit in Fig. 2 to the vacated position above the conduit in Fig. 1. At the open position, and during the travel of the said assembly, the entire body, filled with grease, will be at line pressure, and sufficient flow will take place to create this balanced pressure condition. This balanced pressure condition between the body outside of the conduit member and the line in which the valve is installed will continue to exist unless the pressure in the body is lost while the valve is closed, and there will not, therefore, be any flow of the pipe line fluid into the body cavity outside of the conduit member at any time during the operation of the valve.

As the conduit member approaches the lowered position, as shown in Fig. 9, the two diametrically opposite disc positioning pins 54, which are engaged with their collar-retaining sockets 55 in the boss 12, will be moved outwardly as the cam-plates 57 contact the stop shoulders 53 of the guides 52. This motion moves pin 54 out of engagement with the sockets 55 of the boss 12. With the collar 13 now resting on the stop shoulders 53, Figs. 3 and 8, continued downward motion of the wedge member and conduit assembly will cause relative motion between the disc means 9 and 10, and this assembly by virtue of the connection of the disc means with the collar 13 (Figs. 3 and 7 to 9) created by the rods 47. These rods 47, as has been pointed out, are provided with adjusting means 51 for aligning the disc members with the water-way and the clevises 50 and pivotal connections 48—49 provide for the required lateral motion. As the assembly continues downward, line pressure flowing in the direction of the arrow (Fig. 1) tends to seat the disc 10 on the downstream side, with lateral motion permitted by the continued downward travel of the wedging mechanism. After the seating of the downstream disc 10 the continued downward motion of the wedging mechanism serves to seat the up-stream disc 9 by the opposing force of the wedge at surfaces 26—28 and 25—27. The valve is now closed.

As the assembly of wedge member 11 and conduit member 17 continues its travel after discs 9 and 10 have stopped, the four locking pins 59, Figs. 4, 5, 10 and 11, are brought into engagement with the complemental sockets 60 of the body guides 52, by interaction of the cam slots 61' and the pin studs 62 (Fig. 5). This locking arrangement retains the collar 13 in fixed position in the body until the proper moment in the valve-opening cycle is reached. Thus there is prevented any accidental and unwanted upward shifting of the collar from its fully lowered position, which might be caused by friction between it and the boss 12 upon initiation of upward movement of the wedge member.

To open the valve reverse motion is imparted to the stem 16 and therethrough to the wedge and conduit assembly, and with the first motion upward of the wedging mechanism, the upstream disc 9 unseats, but the downstream disc 10 still being under the influence of the upstream pressure remains on its seat. The antifriction roller bearing means 33 and 34 then come into operation along with the two sets of antifriction roller bearing means 19 and 20. Since the bearing means 33 and 34 are set on an angle in relation to the two sets of bearing means 19 and 20, a wedging action results which pulls the disc 9 from its seat. Since this disc cannot move vertically with the wedge and conduit assembly because of the locked condition of the locking pins 59 (Fig. 5), it moves horizontally, axially of the port 3, and unseats. As the wedge and conduit assembly continues to rise, the pins 59 are withdrawn from their locking sockets 60 by interaction of the cam slots 61' and the pin studs 62 (Fig. 11) and as raising of the assembly continues, the pins 54 will engage the complemental sockets 55, Fig. 9, to thus retain the collar 13 in locked position on the wedge and conduit assembly throughout the remainder of the raising stroke of the stem 16.

The septum of the wedge member 11 is provided with openings 64 (Figs. 1 to 3 and 7 to 9) which permit flow of line fluid through the conduit member as the discs are seated and unseated.

The major features of construction and mode of operation of the modified embodiment of the invention illustrated in Figs. 12 to 18 of the drawings are similar to those described in relation to Figs. 1 to 11, but certain changes in details of construction and arrangement of parts have been made as will now be pointed out.

As shown particularly in Figs. 12, 13 and 16, the antifriction bearing means 19a and 20a have their sprocket means s in cooperation with ladder chains 21a, 22a and 23a, 24a carried by the wedge member 11a and guide means 52a, respectively. Also, the antifriction bearing means 33a and 34a are arranged in respective pairs (Figs. 17 and 18) carried by a framework including a central carrying bar 65 upon which is revolubly mounted a sprocket 66 with its teeth in operative engagement with pairs of rows of ladder pins 67 and 68 (Fig. 15) mounted on the wedge member 11a and disc means 9a and 10a, respectively, thus somewhat simplifying the construction, and the assembly operations, over the form disclosed in the embodiment of Figs. 1 to 11.

As a further simplification of the construction, the rods 47a for suspending the discs 9a and 10a from the collar 13a omit the turnbuckles 51, shown in Figs. 7 to 9, and instead their axial adjustment, to provide for seating adjustment of the discs 9a and 10a, is accomplished by nuts 69 engaging their screw-threaded ends 70 and seated against the upper surface of the collar 13a.

Also, the locking pins 54a (Figs. 13 and 16) are provided with cam-follower heads 71 whereby the pins are positively projected by combined cam and stop members 72 affixed to the body 1a, and are retracted for engagement with the sockets 55a by the cam faces 56a of the guides 52a. This functioning of the pins 54a is well illustrated in the full and broken line showing, respectively, of these parts in Fig. 13.

The locking pins 59a (Figs. 14 and 16) and their operating cam means 61a, 61'a, 62a and 63a, are substantially similar in construction to those already described, and function similarly in locking engagement with, and release from, the sockets 60a of the guides 52a, as illustrated in the full and broken line showings, respectively, of these parts in Fig. 14.

As illustrated in fragmentary detail in Figs. 21 and 22, each of the valve discs, in the embodiment of all of the views illustrating the invention, includes a yieldable seating, sealing ring 88 preferably made of rubber with reinforcing cables or strands (not shown) of suitable material embedded in its peripheral base 89 and with its relatively soft peripheral outer edge or crown 90 (Fig. 22) normally (when in unseated condition) offstanding slightly beyond the peripheral seating face of the disc.

The ring 88 is secured within a recess 91 in the face of the disc having an outer peripheral wall 92 the seating edge 93 of which is chamfered, and is held in place therein by an annular member 94 having a seating face 95 also chamfered, and this annulus is rigidly secured to the disc by a plurality of screws or bolts 96.

As the disc is moved toward the seating surface 8 of the member 6 under the influence of the cooperating wedging surfaces, the edge or crown 90 approaches contact with the seating surface 8, and, within a few thousanths of contact, pressure in the line will act upon the resilient outer portion of the rubber seat ring and wedge it O-ring fashion, between the closing disc and seat member. The seating movement will continue to move the disc until the peripheral edges 93 and 95 of the members 92 and 94 are actually in metal to metal contact with the seating surface 8, at which point it will stop and the pressure will retain the rubber ring as an O-ring seal. In the double-disc type of valve as shown in Figs. 1 to 16, the seating sealing ring is made to contact its complemental seating surface near the internal edge of such surface so that the rubber ring can seal on either side in accordance with the direction of the flow in the pipe line. This feature of designing for metal to metal contact, and including the rubber O-ring type of seal, is incorporated in order to give added protection to the pipe line against possible failure of the rubber sealing ring.

From the foregoing it will be apparent that in accordance with the invention this functioning of the yieldably sealing, seating ring is provided for.

Moreover, substantially effortless operation in the opening and closing of the valve is inherent in the antifriction bearing means interposed between the relatively movable parts, and also the provision of means for confining within the valve a body of lubricant, whether the valve is in open or closed condition, additionally contributes to ease of operation and also to maintenance of the moving parts in friction inhibiting condition.

Furthermore, the means for properly determining, and adjustably maintaining, the proper axial alignment of the discs with the seat means of the ports with which they cooperate when in closed-valve condition is advantageous in insuring faultless operation of the valve in service, and the means for interlocking the wedge member with the collar member and disc means, and the collar member with the guide means of the body, particularly as disclosed in connection with Figs. 1 to 16 insure the proper relative and simultaneous movement of the disc-carrying parts and their proper predetermined stopping and interlocking with the body when in closed-valve condition.

Having reference particularly to Figs. 19 and 20, it will be seen that the mounting of the antifriction rollers is such that, while being appropriately relatively spaced, they may freely rotate upon relative movement of the surfaces upon which they bear. Also, the sprockets *s* are shown as preferably pinned or keyed to a common cross-shaft 97 mounted in resilient bearing bushings 98 to absorb shocks that may occur during operation.

As is the case with the antifriction roller bearing means of the Wheatley application, now Patent No. 2,676,780, and applicant's copending applications hereinbefore referred to, one of which is now Patent No. 2,711,877, the functioning of the roller bearings embodied in the assemblies of the valves of this application is similar to that of rollers placed between a heavy object and a surface over which it is to be moved, with rollers reintroduced in advance of the object as they emerge from behind it during its progress over the surface.

Various changes and modifications are considered to be within the principle of the invention and the scope of the following claims.

What I claim is:

1. In a fluid-flow control valve, a body provided with a pair of complemental ports, one of which serves as an inlet port and the other as an outlet port for the flow of fluid through the valve, seat means surrounding each of said ports, valve disc means for seating cooperation with said seat means, and valve-operating means for moving said disc means transversely of the axes of said ports to open and close the valve, said operating means including a wedge member and a valve stem for imparting movement to said wedge member transversely of the axes of said ports, means connecting said disc means with said wedge member for limited relative movement therebetween, cooperative means on said disc means and wedge member serving to limit such relative movement, complementally vertically inclined bearing surfaces on said disc means and wedge member respectively, antifriction bearing means interposed between said disc means and wedge member and cooperating with said bearing surfaces, said antifriction bearing means being movable with said disc means and wedge member and being shiftable relatively thereto, and complemental cooperating guide means on said body and wedge member respectively for insuring linear movement of said wedge member in a predetermined vertical path substantially medially of the seat means of said ports, said guide means including antifriction bearing means movable with said wedge means and movable relatively thereto and to the guide means of the body.

2. A valve as claimed in claim 1, in which the guide means of said body and wedge members respectively include ladder pins, and the antifriction bearing means include roller bearing assemblies provided with sprockets, the teeth of which may travellingly engage said ladder pins during relative movement between said respective guide means.

3. A valve as claimed in claim 1, in which the guide means of said body and wedge members respectively include vertically extending and rigidly secured chain members providing ladder pins, and the antifriction bearing means include roller bearing assemblies provided with sprockets, the teeth of which may travellingly engage said ladder pins during relative movement between said respective guide means.

4. In a fluid-flow control valve, a body provided with a pair of complemental ports, one of which serves as an inlet port and the other as an outlet port for the flow of fluid through the valve, seat means surrounding each of said ports, valve disc means for seating cooperation with said seat means, and valve-operating means for moving said disc means transversely of the axes of said ports to open and close the valve, said operating means including a wedge member and a valve stem for imparting movement to said wedge member transversely of the axes of said ports, means connecting said disc means with said wedge member for limited relative movement therebetween and including a collar carried by and movable relatively to said wedge member axially of said stem, means carried by said collar for locking engagement with said body, means carried by said collar for locking engagement with said wedge member, independent means operable upon relative movement of said collar and wedge member and said collar and body for respectively releasing the locking means engaging said body and for causing engagement of the locking means between said collar and wedge, cooperative means on said disc means and wedge member serving to limit their relative movement, complementally vertically inclined bearing surfaces on said disc means and wedge member respectively, and antifriction bearing means interposed between said disc means and wedge member and cooperating with said bearing surfaces, said antifriction bearing means being movable with said disc means and wedge member and being shiftable relatively thereto.

5. A valve as claimed in claim 4, in which both of said locking engagement means include axially shiftable pins, the pin for locking engagement with said body being actuated by cam means shiftably reacting between said collar and wedge member, and the pin for locking engagement between said collar and wedge being actuated by cam means affixed to said body.

6. In a fluid-flow control valve, a body provided with a pair of complemental ports, one of which serves as an inlet port and the other as an outlet port for the flow of fluid through the valve, seat means surrounding each of said ports, valve disc means for seating cooperation with said seat means, and valve-operating means for moving said disc means transversely of the axes of said ports to open and close the valve, said operating means including a wedge member and a valve stem for imparting movement to said wedge member transversely of the axes of said ports, means connecting said disc means with said wedge member for limited relative movement therebetween and including suspension means and means for adjusting said suspension means relatively to said disc means and wedge member, cooperative means on said disc means and wedge member serving to limit their relative movement, complementally vertically inclined bearing surfaces on said disc means and wedge member respectively, and antifriction bearing means interposed between said disc means and wedge member and cooperating with said bearing surfaces, said antifriction bearing means being movable with said disc means and wedge member and being shiftable relatively thereto.

7. In a fluid-flow control valve, a body provided with a pair of complemental ports, one of which serves as an inlet port and the other as an outlet port for the flow of fluid through the valve, seat means surrounding each of said ports, valve disc means for seating cooperation with said seat means, and valve-operating means for moving said disc means transversely of the axes of said ports to open and close the valve, said operating means including a wedge member and a valve stem for imparting movement to said wedge member transversely of the axes of said ports, means connecting said disc means with said wedge member for limited relative movement therebetween including a collar carried by and movable relatively to said wedge member axially of said stem, suspension means connecting said disc means with said collar, and means for adjusting said suspension means to effect desired variations in the distance between said disc means and collar and hence between the disc means and wedge member axially of said stem, cooperative means on said disc means and wedge member seving to limit their relative movement, complementally vertically inclined bearing surfaces on said disc means and wedge member respectively, and antifriction bearing means interposed between said disc means and wedge member and cooperating with said bearing surfaces, said antifriction bearing means being movable with said disc means and wedge member and being shiftable relatively thereto.

8. In a fluid-flow control valve, a body provided with a pair of complemental ports, one of which serves as an inlet port and the other as an outlet port for the flow of fluid through the valve, seat means surrounding each of said ports, valve disc means for seating cooperation with said seat means, and valve-operating means for moving said disc means transversely of the axes of said ports to open and close the valve, said operating means including a wedge member and a valve stem for imparting movement to said wedge member transversely of the axes of said ports, means connecting said disc means with said wedge member for limited relative movement therebetween including a collar carried by and movable relatively to said wedge member axially of said stem, suspension means connecting said disc means with said collar, and means for adjusting said suspension means to effect desired variations in the distance between said disc means and collar and hence between the disc means and wedge member axially of said stem, said suspension means including rods attached to said disc means by pivots arranged transversely of the axes of said ports to permit limited oscillation of said disc means during seating and unseating movement thereof with relation to the seat means of said ports, and said adjusting means including means reacting between said rods and collars and serving to provide for alignment of the axes of said disc means with the axes of said ports when said disc means are in seating position relatively to said seat means, cooperative means on said disc means and wedge member serving to limit their relative movement, complementally vertically inclined bearing surfaces on said disc means and wedge member respectively, and antifriction bearing means interposed between said disc means and wedge member and cooperating with said bearing surfaces, said antifriction bearing means being movable with said disc means and wedge member and being shiftable relatively thereto.

References Cited in the file of this patent
UNITED STATES PATENTS

| | | |
|---|---|---|
| 442,458 | Ross | Dec. 9, 1890 |
| 786,043 | Luckett | Mar. 28, 1905 |
| 961,594 | Fisher | June 10, 1910 |
| 1,921,280 | Blake | Aug. 8, 1933 |
| 2,192,331 | Schaefer | Mar. 5, 1940 |
| 2,606,740 | Allen | Aug. 12, 1952 |
| 2,610,821 | Wernberg | Sept. 16, 1952 |
| 2,676,780 | Wheatley | Apr. 27, 1954 |